United States Patent Office 2,742,429
Patented Apr. 17, 1956

2,742,429

LUBRICATING OIL COMPOSITIONS

Guy M. Verley, Harvey, Ill., assignor to Sinclair Refining Company, New York, N. Y., a corporation of Maine No Drawing. Application March 11, 1952,
Serial No. 276,037

8 Claims. (Cl. 252—46.7)

My invention relates to improvements in lubricating oil manufacture and more particularly relates to modification of the phosphorus and sulfur containing lubricating oil additives which comprise the reaction product of turpentine or pinene, and a phosphorus sulfide, particularly phosphorus pentasulfide, to improve its tolerance for silver bearings. My invention provides new and improved lubricating oil additives and lubricating oil compositions based on their use.

Phosphorus and sulfur containing lubricating oil additives of the type represented by the condensation product of turpentine and a phosphorus sulfide, the reaction product of an aliphatic alcohol with such a condensation product, or the reaction product of an alkylated phenol with such a condensation product as described respectively in U. S. Patents 2,486,188; 2,392,252 and 2,409,877 to Robert L. May possess valuable oxidation inhibiting and bearing corrosion inhibiting properties. Under certain conditions of use, however, usually involving excessive oil temperature or water leaks and the like, it has been found that engine oils inhibited with these materials cause corrosion of silver bearing surfaces of Diesel engines. Since the special properties of silver-bearings are leading to their use on a much broader scale in several types of engines, the special problems created by corrosion of silver bearings has become a matter of substantial concern.

I have found that reaction of the above-described turpentine or pinene and phosphorus sulfide reaction products with urea results in the production of new lubricating oil additives of greatly reduced tendencies toward the corrosion of silver bearings. Lubricating oil compositions containing the improved additives are characterized by stability against oxidation, low copper-lead bearing corrosion and cleanliness ratings which in general are equal or superior to the unmodified additives, but that also are characterized by greatly reduced corrosivity toward silver bearings. The improved additives may be produced in several ways by effecting reaction at elevated temperature for a period of time varying inversely with the temperature required to convert the pinene-phosphorus sulfide inhibitor to the urea reaction product. In the course of reaction, apparently part of the original inhibitor is converted by the urea to an oil-insoluble resin which is removed from the product. Preferably, about 4% to about 8% of urea is employed. The reaction conditions usually fall within the range of about 250° to 400° F. and about 6 to 12 hours reaction time.

Most advantageously, the preparation of the improved additives is conducted by reacting a phosphorus sulfide, preferably phosphorus pentasulfide, with alpha pinene for several hours at elevated temperature as described in the above-mentioned patents. If desired, an alkylated phenol such as tertiary butyl phenol or an aliphatic alcohol such as capryl alcohol may be added to the reaction mixture and heating continued. The reaction mixture then is diluted with a mineral oil in the lubricating oil viscosity range, urea is added, and reaction at about 250° to 400° F. is continued for one-half hour, up to about 6 to 12 hours longer. The product is then filtered free of the oil-insoluble resin produced in the urea reaction.

Where the pinene-phosphorus pentasulfide reaction product is further reacted with an alcohol before modification by urea reaction, it is especially advantageous to employ sufficient excess alcohol, e. g. amyl or hexyl alcohol so that it may act as a reaction solvent common to both urea and the hydrocarbon materials and thus improve the efficiency of the reaction. After the addition of the required amount of oil to serve as a handling vehicle for the lubricating oil additive, the alcohol may be flashed off and recovered for subsequent reuse.

Alternatively an oil blend containing the pinene-phosphorus sulfide additive in its usual proportions may be treated with urea at elevated temperature in order to produce the urea modified additive in situ.

The alpha-pinene starting material is termed pinene since technical grade turpentine and pinene products which are available are useful and are obviously much more economical to employ than pure alpha pinene. The technical grade products in general contain about 90% alpha pinene. The phosphorus sulfide of greatest value is phosphorus pentasulfide. Representative aliphatic alcohols and alkylated phenols are set out in the above-identified patents to Robert L. May but, in general, any hydroxy organic such as an alcohol or phenol which will not interfere with the oil solubility of the additive and which does not contain functional groups or substituents introducing undesirable properties may be employed.

The use of as little as 2% urea markedly reduces the corrosivity of the pinene-phosphorus pentasulfide inhibitor. I have found that as much as 16% urea is useful, but the improvement in corrosivity at this level is so slight compared to the increased loss of phosphorus and sulfur to the resin incurred that such a high proportion of urea is not recommended. Allowing for experimental error, a near maximum reduction in corrosivity is obtained with about 4% to 8% urea. The modified reaction products contain slight amounts of nitrogen. In general, the reaction time necessary to accomplish effective reduction in corrosivity is correlative to the temperature. Thus with 4% to 8% urea, reaction times of approximately 6 hours at 275° or 320° F. are sufficient to greatly reduce corrosivity. Long reaction times (24 hours at 275° F. with 8% urea for example or at 320° F. with 4 or 8% urea) reduce the corrosivity still further but with larger losses of phosphorus to insoluble resin. Reaction at 400° F. with 4% urea for one-half hour is sufficient. With concentrations of urea that are too high and with long reaction times, the oxidation inhibiting properties of the pinene-phosphorus pentasulfide additive may be destroyed.

The better pinene-phosphorus sulfide additives contain from about 7 to about 10 moles of pinene reacted for every 2 moles of phosphorus pentasulfide. If an alcohol or alkylated phenol is incorporated, the proportion of alcohol or phenol or total mixture thereof is in the range of about 1 to 3 moles based on 2 moles of phosphorus sulfide. These proportions are established by the desirability of obtaining a reaction product free from excessive amounts of unreacted materials. The proportions are otherwise not critical and may be varied to obtain a product of desired phosphorus and sulfur content. As noted above, the urea modification results in loss of some phosphorus and sulfur, while incorporating a small percentage of nitrogen. The loss may be anticipated and provided for by using sufficient phosphorus sulfide in relation to the organics in the condensation reaction. Ordinarily, both the older pinene-phosphorus sulfide and the new urea-modified products are produced as mineral oil concentrates, conveniently of about 50% concentration.

In application as oxidation inhibitors, the finished lubricating oil may be blended to a given phosphorus content as a control standard, e. g. about 0.05 to 0.1%. The finished oils ordinarily will contain other additives such as detergents, anti-foaming agents, pour depressants, possibly V. I. improvers and the like. The finished oils have oxidation and bearing corrosion inhibiting properties substantially equivalent to oils inhibited with the unmodified pinene-phosphorus pentasulfide additives. However, they also are virtually free of corrosive activity toward silver bearings. In addition, the oils are free of the unpleasant onion-or garlic-like odor associated with the older additives so that there is no need to resort to sulfur chloride reaction of the pinene-phosphorus sulfide reaction products as described in application Serial No. 74,257 filed February 2, 1949, of Ford C. Teeter, now Patent No. 2,621,172, although this may be done, if desired.

Details in the preparation and evaluation of the improved additives will be described by means of illustrative examples. In the examples, the following materials are employed:

*Diluent oil A*—A Mid-Continent solvent treated neutral of 205 SUS viscosity at 100° F. and 78 viscosity index.
*Oil blend B*—A heavy duty SAE 40 oil containing 2% of detergent-1 and 1.75% of a pinene-phosphorus sulfide product or a urea-modified product giving essentially the equivalent per cent phosphorus in a conventionally refined base.
*Oil blend C*—A heavy duty SAE 40 oil containing 2.5% of detergent-2 and 1.75% of a pinene-phosphorus sulfide product or a urea-modified product giving essentially the equivalent per cent phosphorus in a conventionally refined base.
*Detergent-1*—An oil soluble calcium detergent.
*Detergent-2*—An oil soluble barium detergent.

In the examples, the finished oil blends were evaluated for silver corrosivity by means of a test method defined by the Electro-Motive Division, General Motors Corp., EMD method #L. O. 201–47. Two modifications of the method were used which are referred to as the 325° F. EMD and the water-cycle EMD. In the first modification, a temperature of 325° F. instead of 285° F. is used. In the second, the temperature cycles between 200° and 325° F. In the second modification, water is added to the oil under test. In both modifications, aqueous potassium cyanide is used to remove silver sulfides. This however usually results in a greater weight loss than in the #L. O. 201–47 method. Under the conditions of the test, the above detergents give only negligible losses (0.1–1 mg.).

*Example I*

Phosphorus pentasulfide (2 moles) was added gradually to 8.78 moles of pinene at 275° F. After all the pentasulfide was added, the reaction mixture was maintained at 275° F. for a period of six hours. To this mixture was then added sufficient base diluent oil A to give a product with a phosphorus content of about 3.2%. Analysis of this product was as follows: Acid No. 4.58, saponification No. 59.8, percent phosphorus—3.09, and percent sulfur—8.39.

This product was then mixed with 8% urea and the mixture heated for a period of 6 hours at 275°–300° F. The mixture was allowed to cool to about 120° F. and then filtered with the aid of Super-Cel. About 11% by weight of residue remained in the flask. The filtered product analyzed as follows: Acid No. 1.5, saponification No. 37.2, percent phosphorus—2.02 and percent sulfur—6.89.

In order to obtain a finished product which contains about 3.2% phosphorus, the phosphorus pentasulfide-pinene product is diluted with diluent oil to give an intermediate product containing about 3.8–4.0% phosphorus.

An SAE 40 oil containing 2.5% detergent-2 and 1.75% of the modified product (to give 0.038% phosphorus) gave the following low EMD losses.

|  | Mg. loss |
|---|---|
| EMD 325° | 1.5 |
| EMD water cycle | 1.7 |

*Example II*

To 8.78 moles (1200 grams) of alpha-pinene, 2 moles (444 grams) of phosphorus pentasulfide were added during the course of one hour, maintaining the temperature at 275° F. After 6 hours heating 0.78 moles (116 grams) of para-tertiary butyl phenol were added. The mixture was heated for 6 hours, then 0.19 moles (20 grams) of 2-ethyl butanol were added and the heating continued for 6 hours longer at 275° F. 2130 grams of diluent oil A were added to give a phosphorus concentration of 3.30%. The product was filtered clear to yield 3850 grams of product. The product had the following analysis: Acid No. 1.78, saponification No. 59.2, percent phosphors—3.30, percent sulfur—8.67, S/P—2.55, color (NPA)—4½ and EMD water cycle tests as oil blend C—33.8 mg. loss. Typical inspection tests are: Gravity—13.6° API, vis. at 100° F.—1018, vis. at 210° F.—67.2 and color—5 minus.

This product was used to study the variables of urea treatment discussed below and is typical of the product used in the engine tests described below.

*Example III*

The procedure up to the addition of the base oil was identical with the procedure of Example II, except threefold quantities were used. 4660 grams of diluent oil A were added to obtain a phosphorus concentration of 3.7%. The yield was 9930 grams of a product having the following analysis: Acid No. 1.13, saponification No. 69.6, percent phosphorus—3.72, percent sulfur—9.85, S/P—2.56, color (NPA)—4 minus, and EMD water cycle—30.0 mg. loss as oil blend C.

To 9880 grams of the above material, 800 grams of commercial technical grade urea were added while maintaining the temperature at 280° F. The mixture was heated and stirred at 280°–300° F. for 6 hours. The product was then filtered at 120° F. in the presence of about 1% filter aid. The yield was 9200 grams of product having the following analysis: Acid No. 1.73, saponification No. 57.2, percent phosphorus—3.10, percent sulfur—9.05, S/P—2.85, color (NPA)—4 minus, percent nitrogen—0.11 and loss of phosphorus—17%. EMD water cycle test as oil blend C—1.7 mg. loss.

The light colored resin remaining in the flask was washed twice with n-hexane, dried and weighed. The yield was 1430 grams of light golden resin having the following analysis: Acid No. 47.08, saponification No. 203.7, percent phosphorus—5.58, percent sulfur—8.48 and percent nitrogen—28.

The resin is entirely soluble in methanol or water. It is an effective rust inhibitor as described in copending application Serial No. 288,949 filed May 20, 1952.

*Example IV*

To 3259 grams of product manufactured by a procedure identical with the procedure of Example II, 250 grams of commercial urea were added and the mixture heated progressively under a nitrogen atmosphere, with good stirring while the temperature was maintained at 400° F. for 2 hours. Upon reaching 400° F. the flocculent resin started to agglomerate into a hard mass with a loss of ammonia. At the end of 3 hours all the resin was deposited in a brittle, light colored mass on the flask walls, stirrer and thermowell. The supernatant liquid was light colored and nearly clear. The supernatant liquid was filtered at 130° F. with about 1% filter aid. The yield was 2157 grams of product having the following analysis: percent phosphorus—2.06, percent sulfur—7.30, S/P—3.30, percent nitrogen—0.26, color (NPA)—3½, EMD water cycle as oil blend C—2.2 mg. loss, EMD 325° F. as oil blend C—1.0 mg. and loss of phosphorus—38%.

The treatment with urea for 4 hours at 400° F. is rather severe, with a large loss of phosphorus to oil insoluble resin. After washing the flask twice with hexane, 314 grams of brittle resin remained. It was extracted successively with hot methanol and with boiling water, to give three fractions.

*Fraction I*—Soluble in hot methanol. 74 grams of a golden yellow resin. Analysis: percent phosphorus—8.19, percent surfur—10.15 and percent nitrogen—20.32.

*Fraction II*—Soluble in hot water (and insoluble in methanol). 45 grams brown, tacky, viscous material. Analysis: percent phosphorus—11.23, percent sulfur—0.71 and percent nitrogen—24.60.

*Fraction III*—Insoluble in hot methanol and hot water. 94 grams of a gray powder. Analysis: percent phosphorus—2.07, percent sulfur—3.26 and percent nitrogen—31.17.

The reaction at 400° F. changes the nature of the resin formed in that it is no longer completely soluble in water or methanol.

Example V

A batch of the phosphorus pentasulfide alphapinene-para-tertiary butyl alcohol described in Example II was made up in a 1500-gallon Pfaudler kettle. Diluent oil A was added to obtain a phosphorus concentration of 3.7% (640 gallons oil). Two hundred gallons of this product was pumped into a 250-gallon kettle and 65 pounds (4% wt.) of urea was added at 275° F., the temperature was maintained at 280°–290° F. for 6 hours. Some ammonia was liberated. The product was then cooled to room temperature by circulating water in the jacket and left standing for 3 hours. The supernatant liquid was pumped out and filtered without difficulty. The product had the following analysis: Acid No. 1.6, saponification No. 20.3, percent phosphorus—2.91, percent sulfur—9.15, percent nitrogen—0.09, S/P—2.95 and color (NPA) 5. The EMD tests as oil blend B gave 3.8 mgs. loss at 325° F. and 2.5 mgs. loss on the water cycle test; comparing to 8 mgs. loss and 14 mgs. loss respectively with the product before urea modification.

Example VI

The data of this example, tabulated below, indicate the effect of varying urea concentration in reaction conducted for 6 hours at 275° F. The silver corrosion data were obtained with oil blends of the type of oil blend C (above) containing 2.5% detergent-2 and enough of the additive to give 0.056% phosphorus in the oil blend.

| Percent Urea Used | Reaction Product | | | | Loss to Insoluble Resin | | Water Cycle EMD Weight Loss, Mgs. |
|---|---|---|---|---|---|---|---|
| | Percent P | Percent S | Percent N | Atoms S/ Atoms P | Percent P | Percent S | |
| Unmodified Product | 3.30 | 8.67 | ----- | 2.54 | ----- | ----- | 33.8 |
| 2 | 2.78 | 8.36 | 0.08 | 2.71 | 18 | 3.6 | 3.9 |
| 4 | 2.92 | 8.32 | 0.09 | 2.68 | 11.6 | 4.0 | 1.5 |
| 8 | 2.55 | 7.42 | 0.07 | 2.84 | 22.6 | 14.3 | 1.7 |
| 16 | 2.07 | 7.36 | 0.11 | 3.32 | 37 | 15.1 | 1.2 |

Example VII

The data of this example, tabulated below, indicate the effect of varying reaction temperature and time.

TABLE I

| Temp., °F. | Time, Hours | Percent Urea | Reaction Product | | | | Loss to Insoluble Resins | | Water Cycle EMD[1] Weight Loss, Mgs. |
|---|---|---|---|---|---|---|---|---|---|
| | | | Percent P | Percent S | Percent N | Atoms S/ Atoms P | Percent P | Percent S | |
| Unmodified Product | | | 3.30 | 8.67 | ----- | 2.54 | ----- | ----- | 33.8 |
| 275 | 6 | 8 | 2.55 | 7.42 | 0.07 | 2.84 | 22.6 | 14.3 | 1.7 |
| 275 | 24 | 8 | 2.12 | 7.54 | 0.13 | 3.35 | 34.0 | 13.0 | 0.5 |
| 320 | 6 | 4 | 2.43 | 7.48 | 0.11 | 2.88 | 26.4 | 13.6 | 0.8 |
| 320 | 24 | 4 | 1.99 | 7.63 | 0.12 | 3.66 | 38.0 | 11.8 | 0.2 |
| 320 | 6 | 8 | 2.45 | 7.67 | 0.12 | 3.02 | 25.6 | 11.4 | 0.7 |
| 320 | 24 | 8 | 1.84 | 7.26 | 0.12 | 3.85 | 44.2 | 15.5 | 0.2 |
| 400 | 0.5 | 4 | 2.55 | 7.69 | 0.16 | 2.83 | 23 | 11.3 | 1.4 |
| 400 | 4 | 8 | 2.06 | 7.30 | 0.26 | 3.30 | 38 | 15.8 | 2.2 |

[1] Tested as in Example VI.

In further evaluation tests, it was determined by oxygen absorption, Chevrolet L-4 and Caterpillar 1-A tests that the oxidation inhibiting and other useful properties of the pinene-phosphorus sulfide inhibitors are not depreciated. Oils inhibited with the modified and unmodified products oxidize at substantially the same rate. Comparative engine tests show substantially equivalent performance in terms of cleanliness ratings, freedom from wear, varnish and deposits and in capacity to reduce bearing corrosion.

I claim:

1. An oil-soluble lubricating oil additive which essentially comprises a pinene and phosphorus sulfide reaction product which has been modified by elevated temperature reaction with about 4% to about 8% urea.

2. The additive of claim 1 in which the pinene and phosphorus sulfide reaction product has been further reacted before urea modification with a hydroxy organic compound selected from the group consisting of aliphatic alcohols and alkylated phenols.

3. The additive of claim 1 in which the pinene and phosphorus pentasulfide product has been further reacted before urea modification with an aliphatic alchool.

4. The additive of claim 1 in which the pinene and phosphorus pentasulfide product has been further reacted before urea modification with an alkylated phenol.

5. A lubricating oil composition which consists essentially of a mineral lubricating oil base and a minor proportion sufficient to inhibit oxidation and corrosion of a lubricating oil additive soluble therein which is a pinene and phosphorus sulfide reaction product which has been modified by elevated temperature reaction with about 4% to about 8% urea.

6. A lubricating oil composition which consists essentially of a mineral lubricating oil base and a minor proportion sufficient to inhibit oxidation and corrosion of a lubricating oil additive soluble therein which is a reaction product of pinene, phosphorus pentasulfide and a hydroxy organic compound selected from the group consisting of aliphatic alcohols and alkylated phenols which has been modified by elevated temperature reaction with about 4% to about 8% urea.

7. A lubricating oil composition which consists essentially of a mineral lubricating oil base and a minor proportion sufficient to inhibit oxidation and corrosion of a lubricating oil additive soluble therein which is a reaction product of pinene, phosphorus pentasulfide and an aliphatic alcohol which has been modified by elevated temperature reaction with about 4% to about 8% urea.

8. A lubricating oil composition which consists essentially of a mineral lubricating oil base and a minor proportion sufficient to inhibit oxidation and corrosion of a lubricating oil additive soluble therein which is a reaction product of pinene, phosphorus pentasulfide and an alkylated phenol which has been modified by elevated temperature reaction with about 4% to about 8% urea.

References Cited in the file of this patent
UNITED STATES PATENTS

| | | |
|---|---|---|
| 2,316,090 | Kelso | Apr. 6, 1943 |
| 2,356,073 | May | Aug. 15, 1944 |
| 2,356,074 | May | Aug. 15, 1944 |
| 2,392,253 | May | Jan. 1, 1946 |
| 2,534,217 | Bartleson | Dec. 19, 1950 |
| 2,566,398 | Bartleson | Sept. 4, 1951 |
| 2,613,205 | Hill | Oct. 7, 1952 |